3,740,233
CHILLPROOFING BEER WITH ENZYME OBTAINED FROM MUCOR PUSILLUS LINDT
John H. Nelson, Waukesha, Wis., and Paul R. Witt, Elmwood Park, Ill., assignors to Dairyland Food Laboratories, Inc., Waukesha, Wis.
No Drawing. Filed Oct. 15, 1970, Ser. No. 81,174
Int. Cl. C12h 1/12
U.S. Cl. 99—48        5 Claims

ABSTRACT OF THE DISCLOSURE

An enzyme system obtained from pure culture fermentation by *Mucor pusillus* Lindt is utilized in beer production, primarily to enhance chill stability of the finished product.

BACKGROUND OF INVENTION

The ingredients and processes which are included in the brewing of beer yield a number of substances in the colloidal state. These substances are believed to originate primarily within the grains used in the brewing process, and have been identified in part as proteins from barley.

Sandegren (Proceedings European Brewing Convention, 1963, pp. 221–232) has stated that chill haze is "built up mainly of polypeptides and polyphenols."

Enari (Proceedings European Brewing Convention, 1969, pp. 349–356) determined that two beer fractions showed a stronger tendency to form hazes than various other fractions studied. These fractions had an amino acid composition typical for the salt soluble proteins of barley.

Most brewing processes incorporate two filtrations of the fermented beer. The first filtration is referred to as the "primary filtration." Yeast cells and other particulate matter are removed by the primary filtration procedure, and the beer appears clear to visual observation. The second filtration is termed "final filtration." Final filtration immediately precedes carbonation, bottling, and pasteurization.

These filtrations do not completely remove the colloidal substances present in beer. Thus, when the finished beer is stored under refrigeration (40–45° F.), a turbidity or haze may form in the product. This haze is temperature reversible; that is, it can develop under cold storage conditions and disappear when the beer is warmed.

Various processes wherein the haze producing substances are either removed or modified so that haze prevention is minimized are termed "chillproofing." Conventional chillproofing processes commonly involve the addition of an enzyme preparation. Enzyme systems which are used for chillproofing include papain, bromelin, ficin, pepsin, and certain microbial proteases. Virtually all chillproofing enzyme preparations are strongly proteolytic; that is, capable of catalyzing the hydrolysis of a wide variety of proteins, and/or the relatively complete hydrolysis of protein molecules.

Conventional chillproofing practice involves the addition of commercial chillproofing enzyme preparation to beer after it has been subjected to primary filtration. The recommended addition level usually ranges from 0.5–1.0 pounds per 100 barrels (one barrel contains 31 U.S. gallons). The enzyme preparation is usually diluted with a small amount of beer and this dilution is then proportioned into the primary filtered beer to be treated. After enzyme addition, the beer is generally held under cellar storage conditions—at a temperature of 30–35° F.; under a pressure of washed carbon dioxide gas, to minimize the presence of oxygen.

Some brewing processes combine chillproofing enzyme treatment with either a bentonite-type material or polyvinylpyrrolidone. Chillproofing enzymes may be added at a point preceding primary filtration.

The result of chillproofing enzyme treatment must, of course, result in improved chill stability. However, the addition of enzyme must not adversely affect the brewing processes nor can it adversely affect the quality of finished beer, particularly flavor and foam stability.

Chillproofing enzyme preparations are usually standardized by assay in a casein substrate. The assay technique is adapted from the method of Kunitz [J. General Physiology, volume 30, p. 291 (1947)].

SUMMARY OF INVENTION

We have discovered that an enzyme system with relatively mild, specific proteolytic action can function as an effective chillproofing agent. The enzyme system used in our invention is classified as a milk clotting enzyme. Milk clotting enzymes, which are used to curdle milk in cheesemaking, are characterized by their specific action on the kappa casein fraction of milk. Milk clotting enzymes catalyze the hydrolysis of the kappa casein fraction but have little or no effect on the other casein fractions or on the milk serum proteins. The various attributes of milk clotting enzymes are discused by Ernstrom ("Fundamentals of Dairy Chemistry," edited by Webb Johnson; Chapter 12, pp. 606–620).

The enzyme is obtained via pure culture fermentation by *Mucor pusillus* Lindt. For the purposes of describing our invention, the enzyme will be denoted "MPE." The enzyme, which was originally developed for clotting milk in cheese manufacture, is described by Arima and Iwasaki (U.S. Pats. 3,151,039 and 3,212,905).

DESCRIPTION OF PREFFERRED EMBODIMENT

We measure the milk clotting activity of MPE by an assay which utilizes a substrate consisting of nonfat dry milk reconstituted in standardized calcium chloride solution. The clotting activity of unknown enzyme samples is compared to clotting activity of a primary milk clotting enzyme standard under controlled conditions of dilution, temperature, and agitation. The strength of this primary standard is designated to be 100.

We have observed that there are significant differences between the enzyme characteristics of MPE and conventional chillproofing enzymes. One such difference is illustrated by the relative enzyme activities of MPE and a conventional papain chillproofing enzyme preparation assayed by two procedures; the milk clotting enzyme assay just described, and by a casein digestion assay normally used to standardize chillproofing preparations. Data obtained on one such comparison follows:

| Enzyme preparation | Milk clotting activity [1] | Casein digestion activity [2] |
|---|---|---|
| MPE | 94.3 | 217 |
| Commercial papain chillproofing | 69.9 | 2,455 |

[1] Percent of normal or standard reference enzyme.
[2] O.D. units.

The proteolytic activity patterns exhibited by MPE and the commercial chillproofing preparation are markedly different. MPE has 35% more milk clotting activity than commercial chillproofing yet only 8.8% as much casein digestion activity.

A second observation on the relative proteolytic characteristics of MPE and commercial papain chillproofing enzymes is a test utilizing the gelatin emulsion on commercial photographic film. ("A Method for the Quantitative Estimation of Chill Proofer Protease in Beer," P. R. Glenister and Becker: Proceedings of the American Society of Brewing Chemists.)

The test consists of suspending pieces of exposed photographic film in the beer to which either MPE or commercial chillproofing enzyme has been added under standard conditions of time and temperature. The film pieces are removed from the beer and the remaining photographic emulsion is removed by the solvent and measured spectrophotometrically. The proteolytic activity of the enzyme is inversely proportionate to the amount of gelatin emulsion remaining after the film has been submerged in the beer sample and transmittance values are, therefore, directly proportional to enzyme activity.

We compared the activity of MPE and commercial papain chillproofing enzymes in this test procedure as follows: Solutions of MPE or commercial papain were prepared by diluting 0.35 ml. of enzyme preparation to 100 ml. with freshly decarbonated beer. Ten ml. of these diluted solutions were added to 12 ounces (350 ml.) of primary filtered, unpasteurized beer. Spectrophotometric analyses per the procedure described above yielded the following results:

| Enzyme system | Percent transmittance |
|---|---|
| Control (No enzyme added) | 22.0 |
| MPE | 25.5 |
| Commercial papain enzyme | 100.0 |

From this data it is apparent that MPE does not attack the gelatin while conventional papain chillproofing enzyme readily attacks gelatin.

A third difference between MPE and conventional chillproofing enzymes is characterized by the presence (or absence) of milk clotting activity in unpasteurized beers to which MPE or commercial chillproofing enzyme has been added.

In one experiment, ten milliliters of a 0.35% solution of MPE or commercial papain chillproofing enzyme were added to 330 milliliters aliquots of primary filtered beer. This level of chillproofing addition is approximately five times the level normally added in commercial practice. Both beer aliquots were assayed for milk clotting enzyme activity. No milk clotting enzyme activity could be detected in the beer containing commercial papain chillproofing enzyme. Milk clotting activity, approximating the amount of enzyme added and the dilution factor into the beer, was detected in the beer to which MPE had been added.

For the purposes of this invention, we express the amount of enzyme activity of MPE added as the weight of enzyme preparation at 100% assay—the designated strength of the primary milk clotting enzyme standard utilized in the assay.

The units of MPE activity at 100% assay which were added in the examples which described the invention are calculated by multiplying the pounds of enzyme added per 100 barrels of beer by 0.95. The following table lists the MPE activity equivalents of various addition levels.

| Addition level lbs. MPE/100 barrels | Addition level lbs. MPE at 100 test/100 barrels |
|---|---|
| 0.05 | 0.0475 |
| 0.10 | 0.0950 |
| 0.20 | 0.1900 |
| 0.30 | 0.2850 |
| 0.60 | 0.5700 |
| 0.80 | 0.7600 |
| 1.00 | 0.9500 |

The evaluation of chillproofing performance in beer, as manifested in clarity, is expressed in Formazin Turbidity Units, per the Official Method of the American Society of Brewing Chemists. In frech beer, chill haze was determined at 32° F. in beer which had been held at 32° F. for four days. The beer was then warmed to 70° F., held at this temperature for 30 minutes, after which haze was again measured.

Haze stability was also measured after incubating beer at 110° F. for one week, followed by chilling at 32° F. for four days. The 110° F.-one week incubation period is considered to be equivalent to a 60–90-day holding period in trade channels. Similarly, an incubation at 110° F. for two weeks is considered to be equivalent to 120–190 days holding in trade channels.

Foam stability is measured by a collapse rate method. The relationship is inverse, higher values denoting less desirable foam stabilities. A table of numerical values, designating foam quality, follows:

| Index range | Foam rating |
|---|---|
| 0–20 | Excellent. |
| 21–30 | Very good. |
| 31–40 | Good. |
| 41–50 | Fair. |
| Over 50 | Poor. |

Beer flavor was determined via organoleptic examination by a qualified panel of judges. The flavor quality of the beers containing either MPE or commercial papain chillproofing enzyme was judged to be satisfactory in all the examples of our invention which follow.

EXAMPLE 1

A series of sub-lots of primary filtered beer were treated with MPE or a commercial chillproofing enzyme preparation. Addition levels ranged from 0.2 to 1.0 pounds of enzyme preparation per 100 barrels of beer; within usual commercial practice. A control sub-lot containing no chillproofing enzyme was also included.

After a five-day storage period at 32° F., the beer was given the second or "final" filtration, carbonated, bottled, and pasteurized. The beer was incubated at 110° F. for two weeks; chilled at 32° F., for five days; and examined at 32° F. and also after warming to 70° F. Data on the clarity of the beer subjected to various treatments is presented in Table 1. The clarity is expressed as Formazin Turbidity Units (FTU).

The data demonstrates that MPE is superior to regular chillproofing in fresh beer and is comparable or superior in beer as aging or shelf life occurs.

EXAMPLE 2

The effectiveness of MPE treatment before primary filtration is demonstrated by adding MPE at low levels to Ruh beer before primary filtration. After primary filtration either additional MPE or commercial chillproofing enzyme preparations are added in the conventional manner. Table 2 illustrates the improvement in clarity stability resulting from the conventional addition of either MPE or commercial chillproofing enzyme to beer which was first treated with 0.25 pound of MPE per 100 barrels at the Ruh stage, before primary filtration.

Experimentation was also conducted wherein commercial chillproofing enzyme preparation was used to treat the Ruh beer. Although some improvement in final chill stability was accomplished, analogous to the results in Table 2, a marked, undesirable deterioration of foam stability resulted.

EXAMPLE 3

MPE or commercial chillproofing enzyme preparation was added to beer just prior to the fermentation process. Both enzyme systems were added at the rate of 0.05 pound per 100 barrels. Yeast was added to the fermenters at the standard pitching rate ($1 \times 10^6$ cells per ml. of wort).

The resulting chill stability values and foam stability values are listed in Table 3. Comparable, enhanced chill stability was produced by the addition of either MPE or commercial chillproofing enzyme preparation to the fermentation stage. However, the commercial chillproofing enzyme treatment resulted in a marked deterioration of foam stability.

The examples just set forth are representative of the principles of our invention. Other variations within the scope of the invention will be obvious to those practiced in brewing technology and art.

TABLE 1.—COMPARISON OF THE CHILLPROOFING EFFECTIVENESS OF MPE AND COMMERCIAL PAPAIN CHILLPROOFING ENZYME

| Storage time-temp. | Treatment, lbs/100 bbls. | Formazin turbidity units | | | | | |
|---|---|---|---|---|---|---|---|
| | | No Enzyme | | Commercial | | MPE | |
| | | 32° F.[1] | 70° F.[1] | 32° F.[1] | 70° F.[1] | 32° F.[1] | 70° F.[1] |
| Fresh | 0.0 | (60) | 20 | | | | |
| Beer | 0.2 | | | 32 | 18 | 18 | 12 |
| | 0.5 | | | 30 | 18 | 16 | 12 |
| | 0.8 | | | 29 | 18 | 16 | 11 |
| | 1.0 | | | 31 | 17 | 16 | 11 |
| 1 wk. at 110° F. | 0.0 | (105) | | | | | |
| Then 5 days at 32° F. | 0.2 | | | 56 | | 38 | |
| | 0.5 | | | 50 | | 35 | |
| | 0.8 | | | 49 | | 35 | |
| | 1.0 | | | 51 | | 35 | |
| 2 wks. at 110° F. | 0.0 | (210) | 52 | | | | |
| Then 5 days at 32° F. | 0.2 | | | 148 | 50 | 128 | 43 |
| | 0.5 | | | 135 | 46 | 126 | 42 |
| | 0.8 | | | 138 | 44 | 125 | 42 |
| | 1.0 | | | 138 | 44 | 126 | 42 |

[1] Temperature of observation.

TABLE 2.—THE CHILLPROOFING EFFECTIVENESS OF ADDING MPE TO RUH BEER, FOLLOWED BY CONVENTIONAL ADDITION OF EITHER MPE OR COMMERCIAL CHILLPROOFING PREPARATION TO PRIMARY FILTERED BEER

| Storage time-temp. | Treatment, lbs./100 bbls. | Formazin turbidity units | | |
|---|---|---|---|---|
| | | No enzyme, 32° F.[1] | Commercial, 32° F. | MPE, 32° F. |
| Fresh | 0.0 | (60) | | |
| Beer | 0.2 | | 34 | 17 |
| | 0.3 | | 30 | 16 |
| | 0.6 | | 30 | 15 |
| | 0.8 | | 32 | 16 |
| 2 wks. at 110° F. | 0.0 | (210) | | |
| Then 5 days at 32° F. | 0.2 | | 138 | 118 |
| | 0.3 | | 130 | 110 |
| | 0.6 | | 130 | 115 |
| | 0.8 | | 134 | 118 |

[1] Temperature of observation.

TABLE 3.—FINAL CHILL AND FOAM STABILITY RESULTING FROM THE ADDITION OF EITHER MPE OR COMMERCIAL CHILLPROOFING ENZYMES TO THE FERMENTER, FOLLOWED BY A SECOND ADDITION TO PRIMARY FILTERED BEER

| Storage time-temp. | Treatment, lbs./100 bbls. | MPE in fermenter | | | | Commercial in fermenter | | | |
|---|---|---|---|---|---|---|---|---|---|
| | | MPE in primary | | Commercial in primary | | MPE in primary | | Commercial in primary | |
| | | FTU[1] | FI[2] | FTU[1] | FI[2] | FTU[1] | FI[2] | FTU[1] | FI[2] |
| Fresh | 0.2 | 36 | 26 | 36 | 28 | 34 | 60 | 36 | 72 |
| Beer | 0.3 | 32 | 28 | 32 | 28 | 32 | 57 | 32 | 80 |
| 2 wks. at 110° F. | 0.2 | 122 | | 136 | | 118 | | 134 | |
| Then 5 days at 32° F. | 0.3 | 116 | | 134 | | 114 | | 132 | |

[1] Formazin Turbidity Units, observed at 32° F.
[2] Foam Index, higher values denote decreasing foam stability.

We claim:

1. A method for chillproofing beer which comprises adding to the beer a chillproofing enzyme consisting of a milk clotting enzyme preparation produced by cultivation of *Mucor pusillus* Lindt, said enzyme being the sole chillproofing enzyme added in said method.

2. The method according to claim 1 wherein said enzyme is added to the beer after primary filtering and before final filtering thereof.

3. A method according to claim 1 wherein said enzyme is added to the beer before primary filtering thereof and an additional amount of said enzyme is added to the beer after primary filtering and before final filtering thereof.

4. A method of chillproofing beer which comprises adding a chillproofing enzyme consisting of a milk clotting enzyme preparation produced by cultivation of *Mucor pusillus* Lindt to the beer just prior to the fermentation thereof and adding an additional chillproofing enzyme to the beer following fermentation after the primary filtering and before final filtering thereof, said milk clotting enzyme and said additional enzyme being the sole chillproofing enzymes added in said method.

5. The method according to claim 4 wherein said additional chillproofing enzyme also consists of a milk clotting enzyme produced by cultivation of *Mucor pusillus* Lindt.

References Cited

UNITED STATES PATENTS

| | | | |
|---|---|---|---|
| 2,077,447 | 4/1937 | Wallerstein | 99—48 |
| 3,151,039 | 9/1964 | Komagome et al. | 195—62 |
| 3,366,483 | 1/1968 | Stone | 99—48 |
| 2,077,448 | 4/1937 | Wallerstein | 99—48 |
| 2,077,449 | 4/1937 | Wallerstein | 99—48 |

DAVID M. NAFF, Primary Examiner